US009013152B2

(12) United States Patent
Kawamoto et al.

(10) Patent No.: US 9,013,152 B2
(45) Date of Patent: Apr. 21, 2015

(54) POWER STABILIZATION SYSTEM AND POWER STABILIZING METHOD

(75) Inventors: Shinya Kawamoto, Yokohama (JP); Tamotsu Endo, Tokyo (JP); Jun Fujiwara, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 434 days.

(21) Appl. No.: 13/271,459

(22) Filed: Oct. 12, 2011

(65) Prior Publication Data

US 2012/0091967 A1   Apr. 19, 2012

(30) Foreign Application Priority Data

Oct. 14, 2010   (JP) ................................. 2010-231743

(51) Int. Cl.
*H01M 10/46* (2006.01)
*H02J 3/32* (2006.01)

(52) U.S. Cl.
CPC ........................................ *H02J 3/32* (2013.01)

(58) Field of Classification Search
USPC .................. 320/134, 116, 127, 128, 135, 136
See application file for complete search history.

(56) References Cited

U.S. PATENT DOCUMENTS

| 6,563,234 | B2 | 5/2003 | Hasegawa et al. |
| 6,608,396 | B2 * | 8/2003 | Downer et al. ............. 290/40 C |
| 7,570,012 | B2 * | 8/2009 | Dasgupta et al. ............. 320/104 |
| 7,859,202 | B2 * | 12/2010 | Lukic et al. ..................... 318/139 |
| 7,953,525 | B2 * | 5/2011 | Oyobe et al. ..................... 701/22 |
| 7,956,489 | B2 * | 6/2011 | Ichikawa et al. ............. 307/10.1 |
| 8,089,177 | B2 * | 1/2012 | Kato ............................. 307/10.1 |
| 8,229,616 | B2 * | 7/2012 | Aridome et al. ................. 701/22 |
| 8,267,207 | B2 * | 9/2012 | Ichikawa ....................... 180/65.1 |
| 8,410,755 | B2 * | 4/2013 | Chau .............................. 320/118 |
| 2001/0012211 | A1 | 8/2001 | Hasegawa et al. |
| 2009/0315512 | A1 | 12/2009 | Ichikawa et al. |
| 2010/0000809 | A1 | 1/2010 | Nishi et al. |

(Continued)

FOREIGN PATENT DOCUMENTS

| CN | 101436650 A | 5/2009 |
| CN | 101496255 A | 7/2009 |

(Continued)

OTHER PUBLICATIONS

Chinese Office Action dated Apr. 17, 2014 issued in Chinese Application No. 201110309472.1.

(Continued)

*Primary Examiner* — Edward Tso
(74) *Attorney, Agent, or Firm* — Holtz, Holtz, Goodman & Chick PC

(57) ABSTRACT

According to one embodiment, a power stabilization system includes a first power converter which is connected to a power system and performs bidirectional conversion between AC power and DC power. The power stabilization system includes a plurality of battery modules each including a secondary battery. The power stabilization system includes a second power converter which is connected between the first power converter and the battery module, converts DC power from the first power converter and charges a secondary battery of the battery module, and converts electric power charged in the battery module and discharges the converted electric power to the first power converter. The power stabilization system includes a controller which controls charge or discharge of each of the plurality of battery modules in accordance with a state of the power system.

9 Claims, 11 Drawing Sheets

(56) References Cited

U.S. PATENT DOCUMENTS

| | | | |
|---|---|---|---|
| 2010/0094497 A1* | 4/2010 | Oyobe et al. | 701/22 |
| 2011/0175451 A1 | 7/2011 | Moon | |

FOREIGN PATENT DOCUMENTS

| | | | |
|---|---|---|---|
| CN | 101501957 A | 8/2009 |
| CN | 102130464 A | 7/2011 |
| JP | 08-065895 A | 3/1996 |
| JP | 2000278872 A | 10/2000 |
| JP | 2004-180467 A | 6/2004 |
| JP | 2005515747 A | 5/2005 |
| JP | 2007060796 A | 3/2007 |
| JP | 2008236902 A | 10/2008 |

OTHER PUBLICATIONS

Japanese Office Action dated Jul. 29, 2014, issued in counterpart Japanese Application No. 2010-231743.

Chinese Office Action dated Oct. 31, 2013 (and English translation thereof) in counterpart Chinese Application No. 201110309472.1.

* cited by examiner

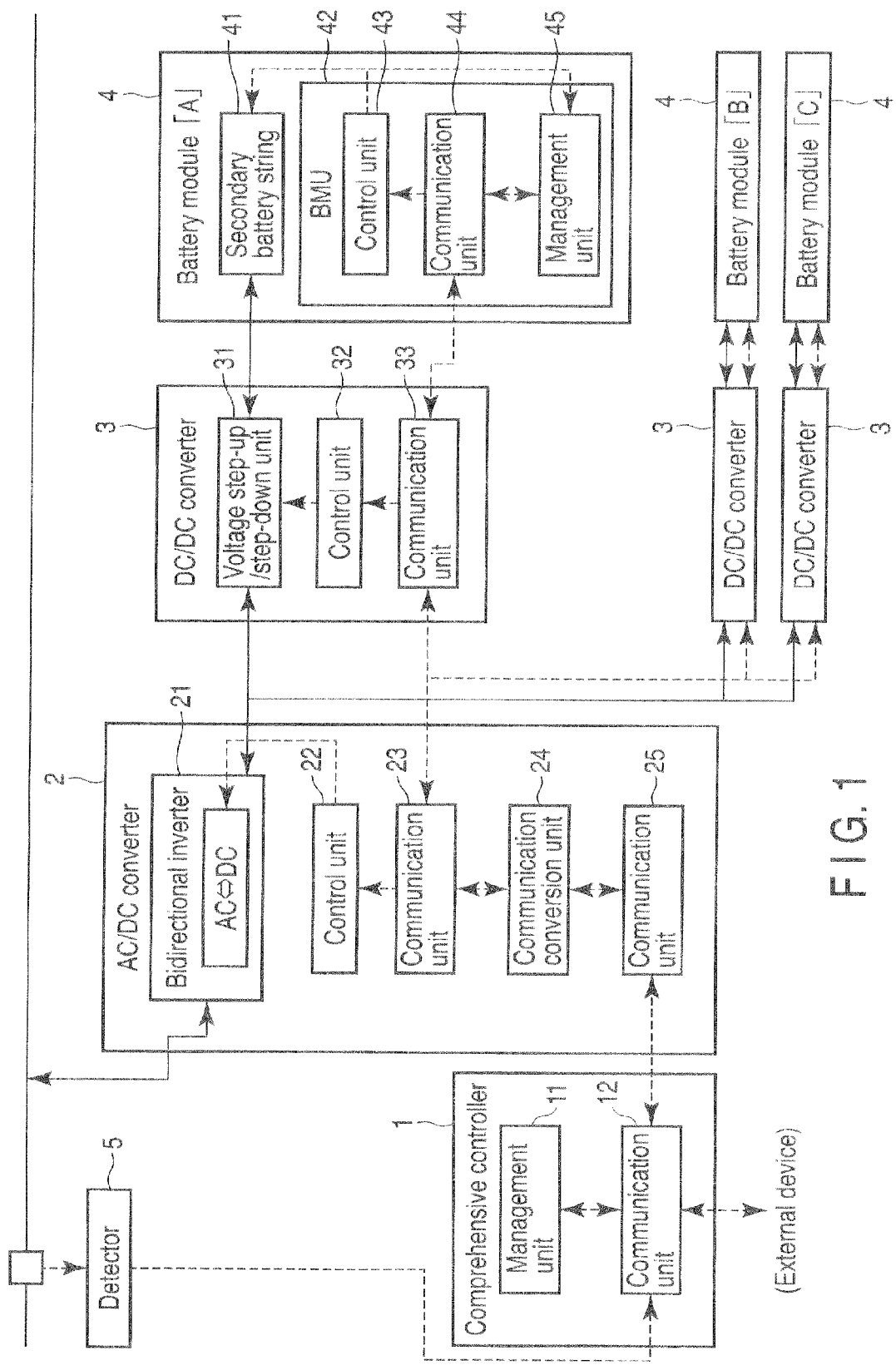
F I G. 1

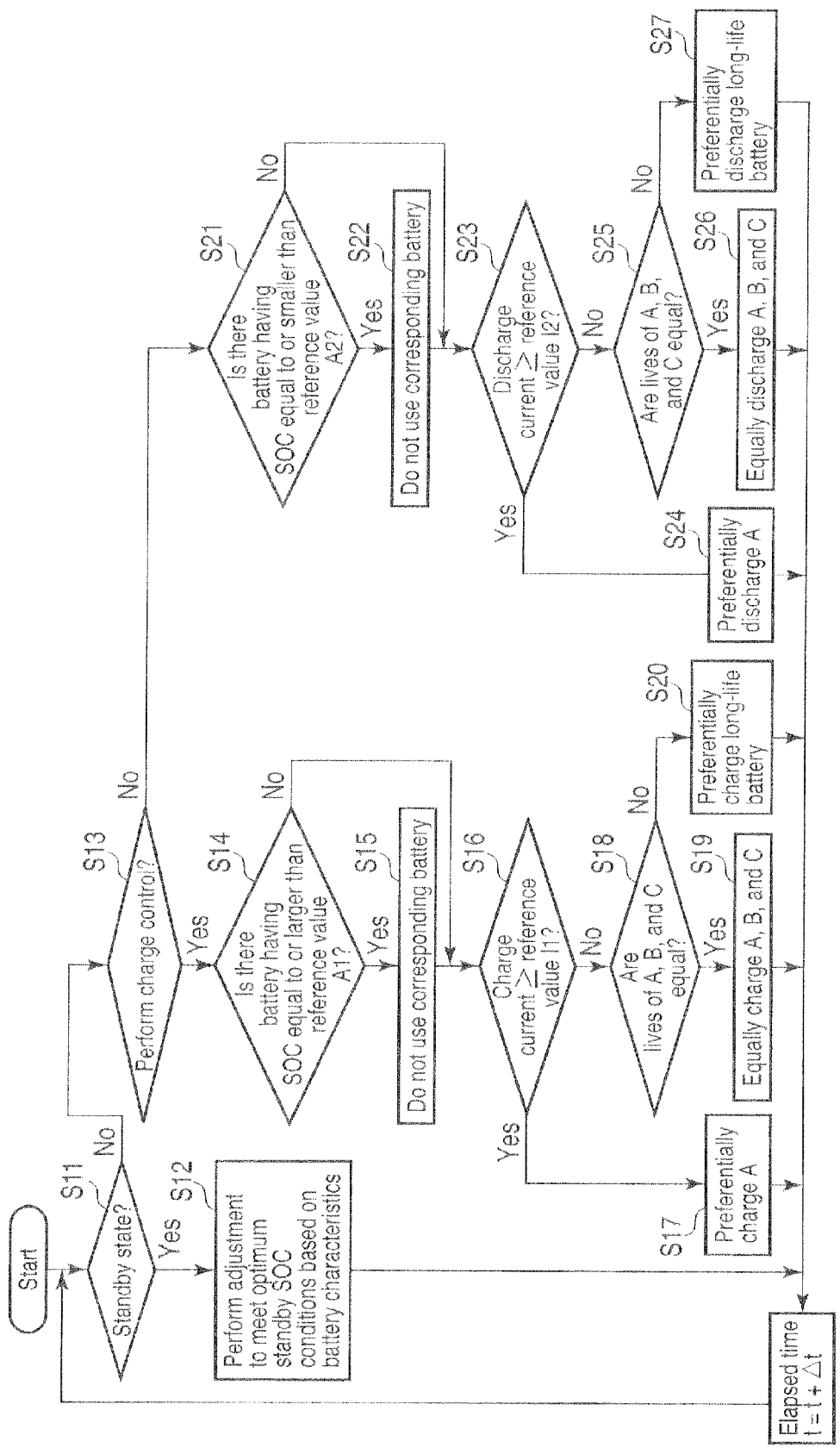
F I G. 3

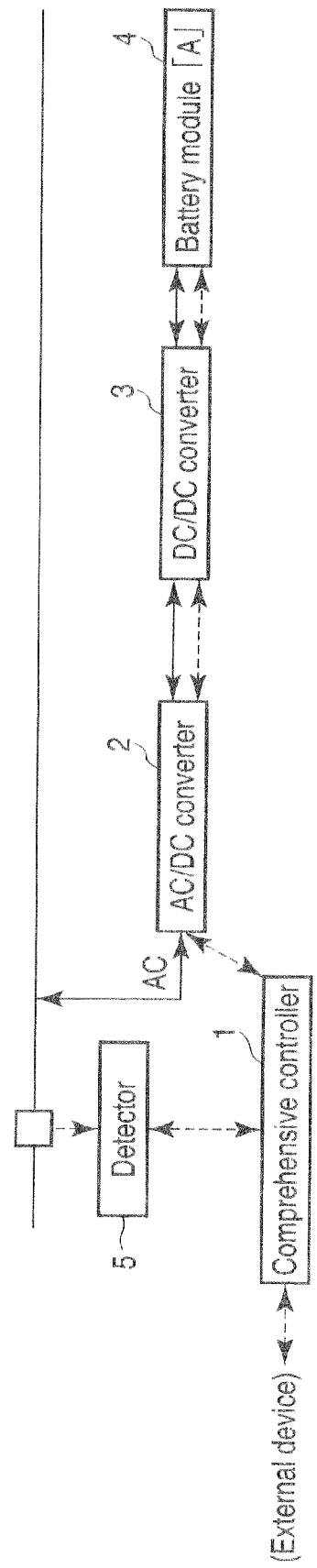
F I G. 4

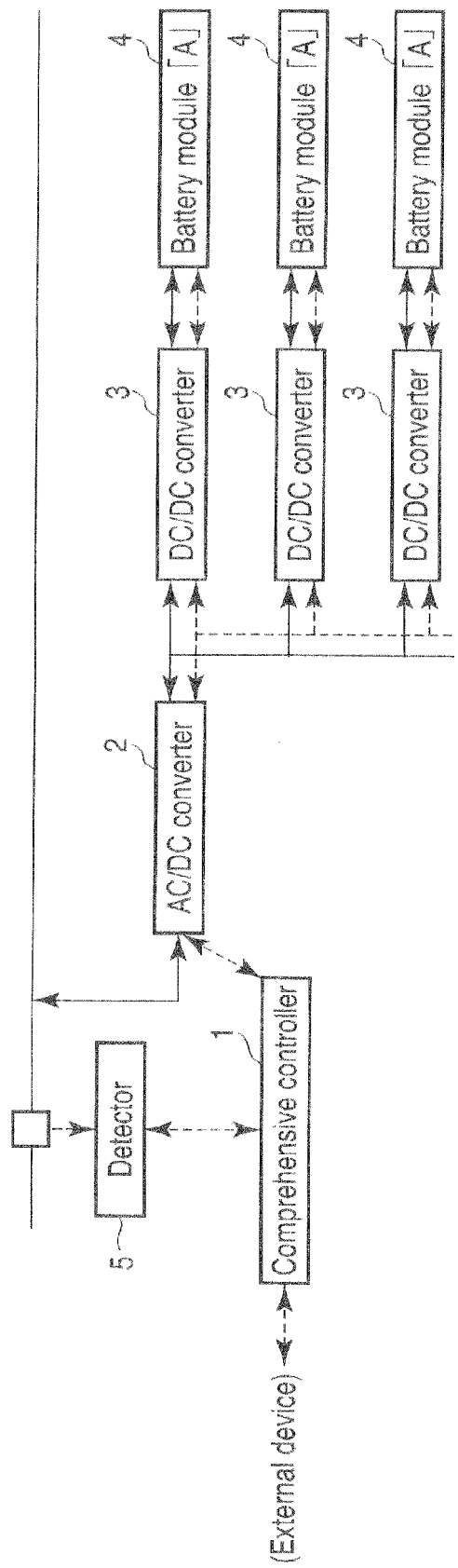
F I G. 5

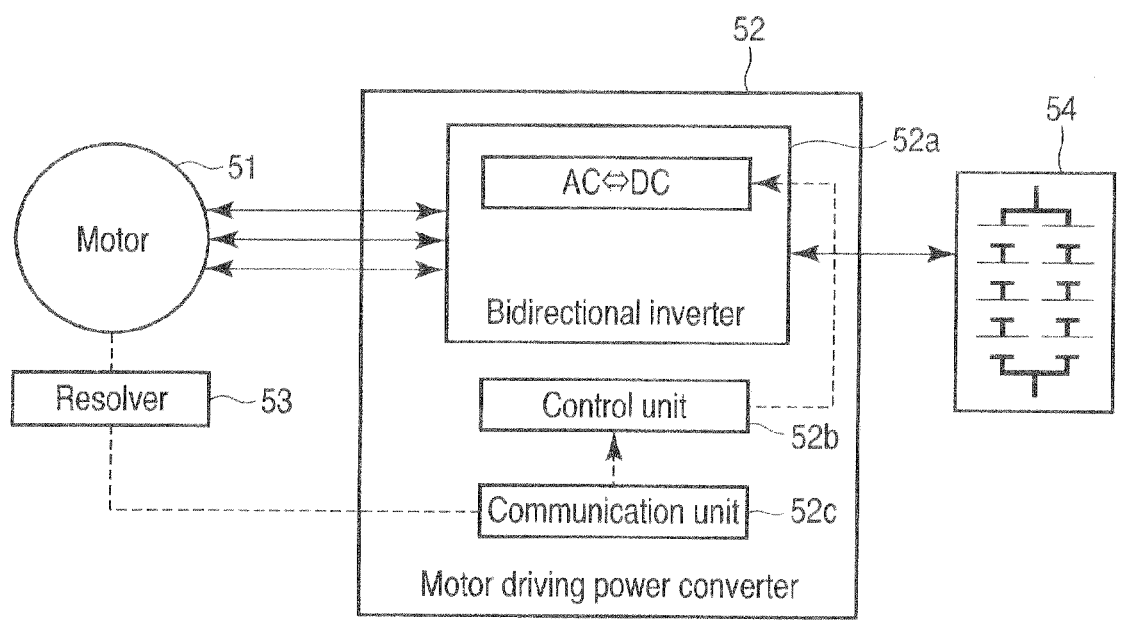
F I G. 6

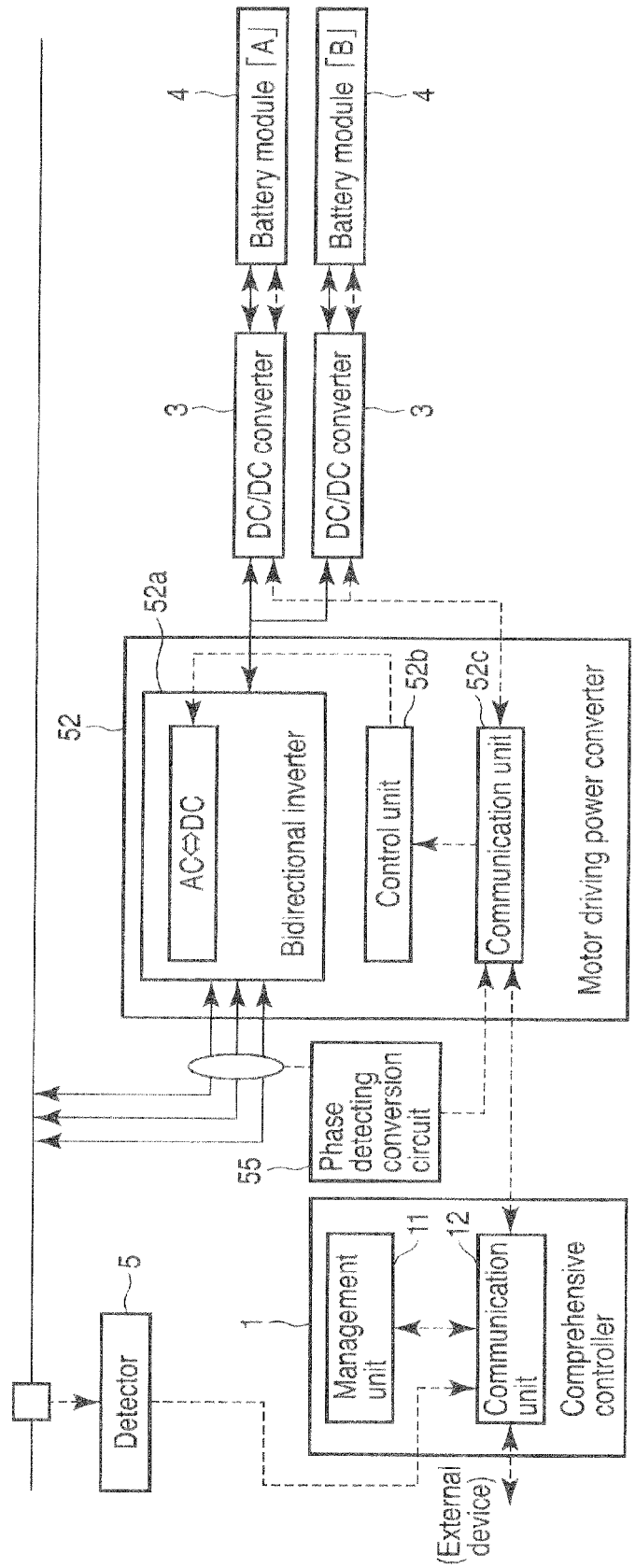
F I G. 7

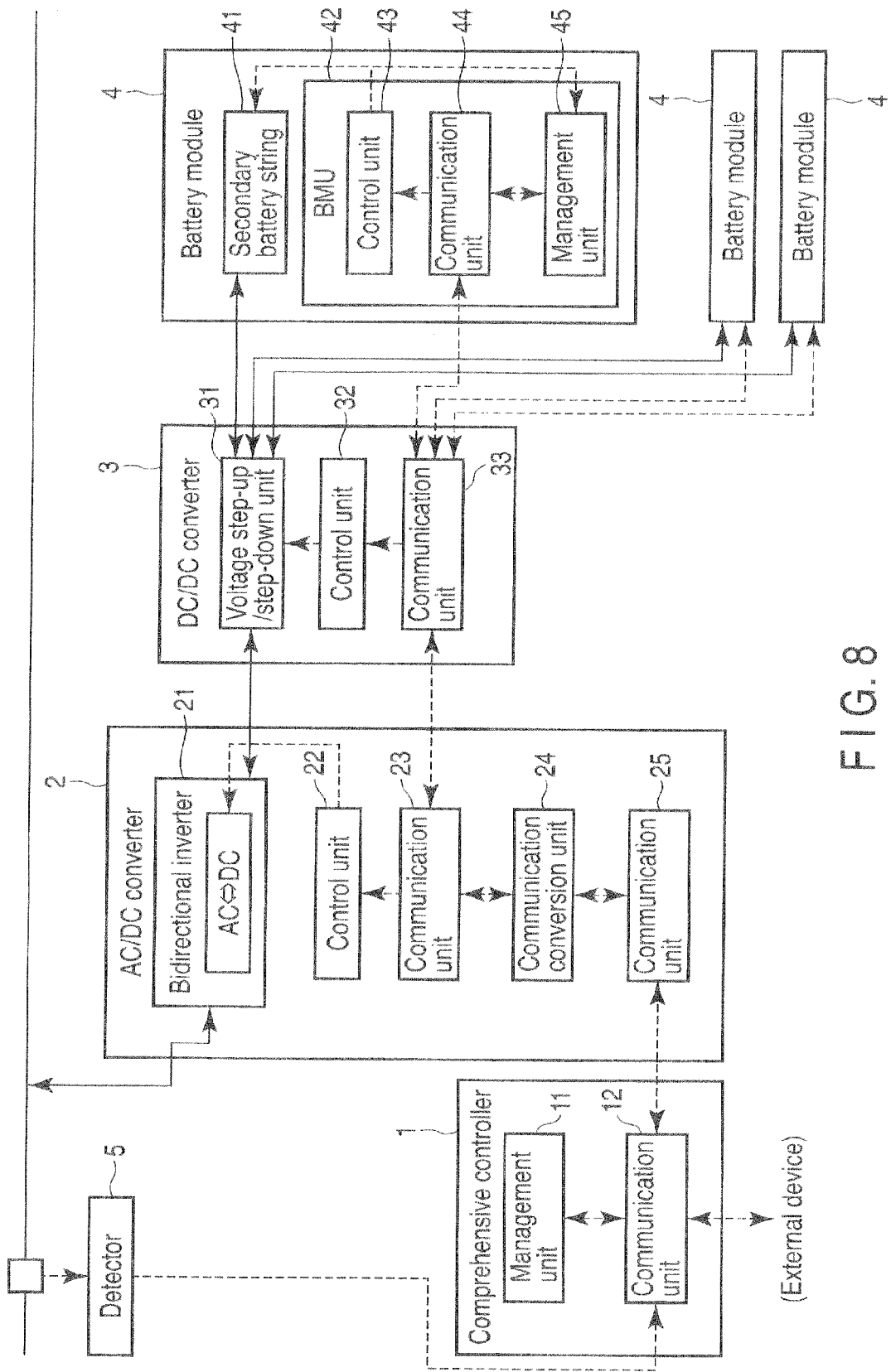
F I G. 8

POWER STABILIZATION SYSTEM AND POWER STABILIZING METHOD

CROSS-REFERENCE TO RELATED APPLICATIONS

This application is based upon and claims the benefit of priority from prior Japanese Patent Application No. 2010-231743, filed Oct. 14, 2010, the entire contents of which are incorporated herein by reference.

FIELD

Embodiments described herein relate generally to a power stabilization system including a battery module containing a secondary battery, and a power stabilization method.

BACKGROUND

Conventionally, demands for electric power are progressively increasing, and power systems have become complicated. Therefore, a power stabilization system for stably supplying electric power is necessary, and various apparatuses have been proposed. Also, several apparatuses using a battery module for charging or discharging a power system have been proposed.

Some power stabilization systems described above include a plurality of battery modules, but the ratios of the charge amounts and discharge amounts of these battery modules are the same. Therefore, it may become impossible to properly maintain the stability of a power system, or the remaining life of the charge/discharge count of a given battery module may become much shorter than those of other battery modules.

BRIEF DESCRIPTION OF THE DRAWINGS

FIG. 1 is a block diagram showing a configuration example before a power stabilization system according to the first embodiment is extended;

FIG. 3 is a flowchart showing an example of the procedure of the charge/discharge life control process performed by the power stabilization system according to the first embodiment;

FIG. 4 is block diagrams showing configuration examples of the power stabilization system according to the second embodiment;

FIG. 5 is block diagrams showing configuration examples of the power stabilization system according to the second embodiment;

FIG. 6 is a block diagram showing a configuration example of a motor driving power conversion system for use in a power stabilization system according to the third embodiment;

FIG. 7 is a block diagram showing a configuration example of a power stabilization system according to the third embodiment;

FIG. 8 is a flowchart showing an example of a procedure performed by the power stabilization system according to the fourth embodiment;

DETAILED DESCRIPTION

Figure 2:
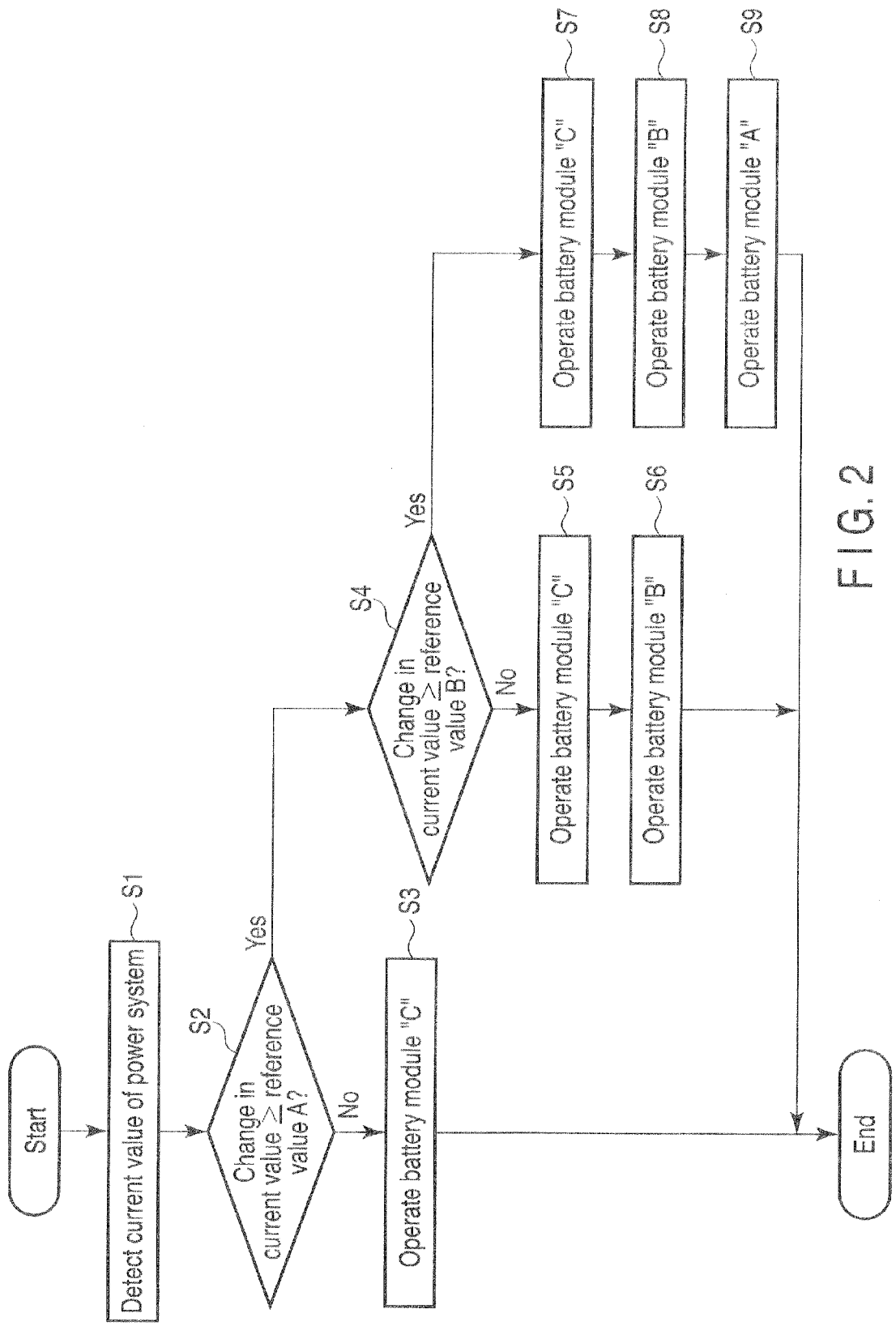
FIG. 2 is a flowchart showing an example of the procedure of the module selecting process performed by the power stabilization system according to the first embodiment.

In general, according to one embodiment, a power stabilization system includes a first power converter which is connected to a power system and performs bidirectional conversion between AC power and DC power. The power stabilization system includes a plurality of battery modules each including a secondary battery. The power stabilization system includes a second power converter which is connected between the first power converter and the battery module, converts DC power from the first power converter and charges a secondary battery of the battery module, and converts electric power charged in the battery module and discharges the converted electric power to the first power converter. The power stabilization system includes a controller which controls charge or discharge of each of the plurality of battery modules in accordance with a state of the power system.

Embodiments will be explained below with reference to the accompanying drawing.

First Embodiment

First, the first embodiment will be described.

FIG. 1 is a block diagram showing a configuration example before a power stabilization system according to the first embodiment is extended.

The power stabilization system shown in FIG. 1 is a system connected to a distribution system as a power system in a building, and includes a comprehensive controller 1 for comprehensively controlling the entire system, an AC/DC converter 2, DC/DC converters 3, battery modules 4, and a detector 5. The detector 5 is, e.g., a current sensor of the distribution system, or an energy management system (EMS) receiving terminal. The EMS is a power management system installed outside the system.

The comprehensive controller 1 includes a management unit 11 and communication unit 12.

The management unit 11 has a load distribution control function of controlling the charge/discharge amount of each battery module 4 based on battery information of the battery module 4.

The communication unit 12 acquires the battery information of each battery module 4 by performing communication via the AC/DC converter 2 and DC/DC converter 3.

The AC/DC converter includes bidirectional inverter control unit 22, communication unit 23, communication conversion unit communication unit 25.

The bidirectional inverter 21 converts AC power from the distribution system into DC power and outputs the DC power to the DC/DC converters 3, and converters DC power from the DC/DC converters 3 into AC power and outputs the AC power to the distribution system.

The control unit 22 controls the operation of the bidirectional inverter 21 based on a communication command from the comprehensive controller 1.

The communication unit 23 exchanges information with the DC/DC converters 3. The communication unit 25 exchanges information with the comprehensive controller 1. The communication conversion unit 24 performs a conversion process between information to be processed by the communication unit 23 and information to be processed by the communication unit 25.

The DC/DC converter 3 includes a voltage step-up/step-down unit 31, control unit 32, and communication unit 33.

The voltage step-up/step-down unit 31 performs voltage conversion on DC power from the AC/DC converter 2 and charges a secondary battery or the battery module 4, and performs voltage conversion on electric power stored in the secondary battery and discharges the power to the AC/DC converter 2.

The control unit 32 controls the voltage step-up/step-down unit 31 based on communication commands from the comprehensive control 1 and AC/DC converter 2.

The communication unit 33 exchanges information with the AC/DC converter 2 and battery module 4.

The battery module 4 includes a secondary battery string 41 and battery management unit (BMU) 42. The BMU 42 includes a control unit 43, communication unit 44, and management unit 45.

The secondary battery string 41 is obtained by connecting secondary batteries such as lithium ion batteries, Ni—MH batteries, or lead-acid batteries in a series-parallel manner.

The control unit 43 of the BMU 42 controls the secondary battery string based on a communication command from the DC/DC converter 3, thereby charging or discharging the batteries. The communication unit 44 exchanges information with the DC/DC converter 3. The management unit 45 manages battery information of the secondary battery string 41 such as the voltage, the electric current, the temperature, the state-of-charge (SOC) value, the internal resistance, and the charge/discharge integrated current, thereby sensing an abnormality or the remaining life of the charge/discharge count of the secondary battery string 41.

In this embodiment, the number of battery modules 4 is three, and one DC/DC converter 3 is installed for each battery module 4. More specifically, a first DC/DC converter 3 is installed between the AC/DC converter 2 and a first battery module 4, a second DC/DC converter 3 is installed between the AC/DC converter 2 and a second battery module 4, and a third DC/DC converter 3 is installed between the AC/DC converter 2 and a third battery module 4.

The battery modules 4 are classified into three battery modules, i.e., battery modules "A", "B", and "C" having different characteristics. The secondary battery string 41 of battery module "A" includes lithium ion batteries. The secondary battery string 41 of battery module "B" includes Ni—MH batteries. The secondary battery string 41 of battery module "C" includes lead-acid batteries.

A module selecting process performed by the power stabilization system according to the first embodiment will now be explained. This process is a process of selecting a battery module to be charged or discharged from the plurality of battery modules 4, in accordance with the current value of the distribution system.

FIG. 2 is a flowchart showing an example of the procedure of the module selecting process performed by the power stabilization system according to the first embodiment.

First, the detector 5 detects the current value of the distribution system (step S1), and the communication unit 12 of the comprehensive controller 1 receives this detected current value. If the change in received current value is smaller than a predetermined reference value A, the management unit 11 outputs a command signal for charging or discharging only battery module "C" (step S2→step S3). This signal is transmitted from the communication unit 12 of the comprehensive controller 1 to the communication unit 44 of battery module "C" via a communication path for battery module "C", which is a communication path including the communication unit 25, communication conversion unit 24, and communication unit 23 of the AC/DC converter 2 and the communication unit 33 of the DC/DC converter 3 for battery module "C". Based on this signal, the control unit 43 of the battery module charges or discharges the secondary battery string 41 of the battery module.

The command signal from the comprehensive controller 1 is also input to the control unit 32 of the DC/DC converter 3 for battery module "C" via the communication unit 33. Based on this signal, the control unit 32 controls the voltage step-up/step-down unit 31. Furthermore, the command signal from the comprehensive controller 1 is input to the control unit 22 of the AC/DC converter 2 via the communication unit 23. Based on this signal, the control unit 22 controls the bidirectional inverter 21.

If the above-described frequency is equal to or higher than the reference value A but is lower than a reference value B larger than the reference value A, signal for charging or discharging only battery modules "B" and "C" is output (step S4→steps S5 and S6). This signal is transmitted from the communication unit 12 of the comprehensive controller 1 to the communication units 44 of battery modules "B" and "C" via communication paths for battery modules "B" and "C", which are communication paths including the communication unit 25, communication conversion unit 24, and communication unit 23 of the AC/DC converter 2 and the communication units of the DC/DC converters 3 for battery modules "B" and "C". Based on this signal, the control unit 43 of each battery module charges or discharges the secondary battery string 41 of the battier module. Also, the voltage step-up/step-down unit 31 and bidirectional inverter 21 are controlled as described above.

If the above-described frequency is equal to or higher than the reference value B, a signal for charging or discharging battery modules "A", "B", and "C" is output (step S7→steps S8, S9, and S10). This signal is transmitted from the communication unit 12 of the comprehensive controller 1 to the communication units 44 of battery modules "A", "B", and "C" via communication paths for battery modules "A", "B", and "C", which include the communication unit 25, communication conversion unit 24, and communication unit 23 of the AC/DC converter 2 and the communication units 33 of the DC/DC converters 3 for battery modules "A", "B", and "C". Based on this signal, the control unit 43 of each battery module charges of discharges the secondary battery string 41 of the battery module. In addition, the voltage step-up/step-down unit 31 and bidirectional inverter 21 are controlled as described previously.

Next, a charge/discharge life control process performed by the power stabilization system according to the first embodiment will be explained. This process is a process of selecting a battery module as a charge destination or discharge source, or adjusting the charge amount in a charge/discharge standby state, in order to prolong the remaining life of the charge/discharge count of each of the plurality of battery modules.

FIG. 3 is a flowchart showing an example of the procedure of the charge/discharge life control process performed by the power stabilization system according to the first embodiment.

First, if the operation state of each battery module 4 is the charge/discharge standby state (YES in step S11), the management unit 11 of the comprehensive controller 1 acquires a charged state value SOC and the remaining life of the charge/discharge count of each module.

More specifically, the management unit 11 outputs a battery information request signal from the communication unit 12. This signal is transmitted to the management unit 45 of each battery module 4 via the communication unit 25, communication conversion unit 24, and communication unit 23 of the AC/DC converter 2, the communication unit 33 of the DC/DC converter 3, and the communication unit 44 of the battery module 4. The management unit 45 outputs the values of the SOC and remaining life of the secondary battery string 41 of the battery module from the communication unit 44. This signal is transmitted to the management unit 11 of the comprehensive controller 1 via the communication unit 33 of the DC/DC converter 3, the communication unit 23, communication conversion unit 24, and communication unit 25 of the AC/DC converter 2, and the communication unit 12 of the comprehensive controller 1. Thus, the management unit 11 acquires the charged state value SOC, the remaining life of the charge/discharge count, and the like.

The management unit 11 outputs a command signal for adjusting the charge amount of the secondary battery string 41 of each battery module 4, so that the charge amount of the secondary battery string 41 of the battery module 4 meets the above-described optimum conditions for prolonging the remaining life, which are based on the characteristics of the secondary batteries. The above-described optimum conditions are, e.g., conditions that the charge amounts of battery modules "A" and "B" are 50% of maximum values and that of battery module "C" is 100% of a maximum value.

This command signal is transmitted from the communication unit 12 of the comprehensive controller 1 to the communication unit 44 of battery module "C" via the communication unit 25, communication conversion unit 24, and communication unit 23 of the AC/DC converter 2 and the communication unit 33 of the DC/DC converter 3 for battery module "C". Based on this signal, the control unit 43 of the battery module charges or discharges the secondary battery string 41 (step S12).

Also, if the operation state of each battery module 4 is not the charge/discharge standby state (NO in step S11), if charge control is to be performed (YES in step S13), and if the battery module 4 including the secondary battery string 41 whose charged state value SOC is equal to or larger than a reference value A1 exists among battery modules "A", "B", and "C" (YES in step S14), the management unit 11 of the comprehensive controller 1 determines not to charge the corresponding battery module 4 (step S15). The management unit 11 selects, as battery modules to be used, the battery modules 4 other than this battery module that is riot to be used. Note that the reference value A1 is a value set for each battery module 4 in accordance with the characteristics of the battery module 4.

If there is no battery module 4 including the secondary battery string 41 whose charged state value SOC is equal to or larger than the reference value A1 (NO in step S14), the management unit 11 selects all the battery modules 4 as battery modules to be used.

If a charge current of the selected battery module to be used is equal to or larger than a reference value I1 (YES in step S16), the management unit 11 outputs a signal for preferentially charging battery module "A". This signal is transmitted from the communication unit 12 of the comprehensive controller 1 to the communication unit 44 of battery module "A" via the above-described communication path for battery module "A". Based on this signal, the control unit 43 of the battery module charges the secondary battery string 41 of the battery module. Also, the voltage step-up/step-down unit 31 and bidirectional inverter 21 are controlled as described above (step S17).

If the charge current of the selected battery module to be used is smaller than the reference value I1 (NO in step S16) and the remaining lives of battery modules "A", "B", and "C" are equal (YES in step S18), the management unit 11 outputs a signal for equally charging battery modules "A", "E", and "C". This signal is transmitted from the communication unit 12 of the comprehensive controller 1 to the communication units 44 of battery modules "A", "B", and "C" via the above-described communication paths for battery modules "A", "B", and "C". Based on this signal, the control unit 43 of each battery module charges the secondary battery string 41 of the battery module. In addition, the voltage step-up/step-down unit 31 and bidirectional inverter 21 are controlled as described previously (step S19).

If the charge current of the selected battery module to be used is smaller than the reference value (NO in step S16) and the remaining lives of battery modules "A", "B", and "C" are unequal (NO in step S18), the management unit 11 outputs a signal for preferentially charging one of battery modules "A", "B", and "C", which has a long remaining life. This signal is transmitted from the communication unit 12 of the comprehensive controller 1 to the communication unit 44 of the corresponding battery module via the above-described communication path for a preferential battery module. Based on this signal, the control unit 43 of the battery module charges the secondary battery string 41 of the battery module. Also, the voltage step-up/step-down unit 31 and bidirectional inverter 21 are controlled as described above (step S20).

If the operation state of each battery module 4 is not the charge/discharge standby state (NO in step S11), if no charge control is to be performed, i.e., discharge control is to be performed (NO in step S13), and if a battery module including a secondary battery string whose charged state value SOC is smaller than a reference value A2 exists among battery modules "A", "B", and "C" (YES in step S21), the management unit 11 of the comprehensive controller 1 determines not to discharge the corresponding battery module (step S22). The management unit 11 selects, as battery modules to be used, the battery modules 4 other than this battery module that is not to be used. Note that the reference value A2 is a value set for each battery module 4 in accordance with the characteristics of the battery module 4.

If there is no battery module 4 including a secondary battery string whose charged state value SOC is equal to or larger than the reference value A2 (NO in step S21), the management unit 11 selects all the battery modules 4 as battery modules to be used.

If a discharge current of the selected battery module to be used is equal to or larger than a reference value I2 (YES in step S23), the management unit 11 outputs a signal for preferentially discharging battery module "A". This signal is transmitted from the communication unit 12 of the comprehensive controller 1 to the communication unit 44 of battery module "A" via the above-described communication path for battery module "A". Based on this signal, the control unit 43 of the battery module discharges the secondary battery string 41 of the battery module. Also, the voltage step-up/step-down unit 31 and bidirectional inverter 21 are controlled as described above (step 24).

If the discharge current of the selected battery module to be used is smaller than the reference value (NO in step S23) and the remaining lives of battery modules "A", "B", and "C" are equal (YES in step S25), the management unit 11 outputs a signal for equally discharging battery modules "A", "B", and "C". This signal is transmitted from the communication unit 12 of the comprehensive controller 1 to the communication units 44 of battery modules "A", "B", and "C" via the above-described communication paths for battery modules "A", "B", and "C". Based on this signal, the control unit 43 of each battery module discharges the secondary battery string 41 of the battery module. In addition, the voltage step-up/step-down unit 31 and bidirectional inverter 21 are controlled as described previously (step S26).

If the discharge current of the selected battery module to be used is smaller than the reference value (NO in step S23) and the remaining lives of battery modules "A", "B", and "C" are unequal (NO in step S25), the management unit 11 outputs a signal for preferentially discharging one of battery modules "A", "B", and "C", which has a long remaining life. This signal is transmitted from the communication unit 12 of the comprehensive controller 1 to the communication unit 44 of the corresponding battery module via the above-described communication path for a preferential battery module. Based on this signal, the control unit 43 of the battery module discharges the secondary battery string 41 of the battery module. Also, the voltage step-up/step-down unit 31 and bidirectional inverter 21 are controlled as described above (step S27). After steps S17, S19, S20, S24, S26, and S27 as the charge or discharge control steps, the process returns to step S11 when a predetermined time has elapsed, i.e., when time t becomes t+Δt.

As described above, the power stabilization system according to the first embodiment performs the process of selecting a module to be charged or discharged from the plurality of battery modules, in accordance with the current value of the distribution system, and also performs the process of selecting a battery module as a charge destination or discharge source, or adjusting the charge amount in the charge/discharge standby state, in order to prolong the remaining life of the charge/discharge count of each of the plurality of battery modules. Therefore, the stability of electric power can properly be maintained, and the remaining life of the charge/discharge count of any battery module does not become much shorter than those of other battery modules. This makes it possible to appropriately stabilize the electric power of the distribution system.

Second Embodiment

Next, the second embodiment will be explained. Note that the configuration of a power stabilization system according to each embodiment described below is basically the same as that shown in FIG. 1, so a repetitive explanation of the same portions will be omitted.

In this embodiment, when increasing the number of battery modules 4 to be used and the number of DC/DC converters 3 to be connected to the battery modules 4 to be used in order to increase the capacity of the battery module 4 in the system with the rating of the output power of an AC/DC converter 2 being constant, a comprehensive controller 1 performs control in accordance with the increase.

FIGS. 4 and 5 are block diagrams showing configuration examples of the power stabilization system according to the second embodiment.

The configuration shown in FIG. 4 is a configuration before the capacity of the battery module 4 in the system is increased. In addition to the comprehensive controller 1, a detector 5, and the AC/DC converter 2 explained the first embodiment, one DC/DC converter 3 is connected to the AC/DC converter 2, and one battery module 4 is connected to the DC/DC converter 3. In this embodiment, the output power values of the AC/DC converter 2 and DC/DC converter 3 are 50 kw.

The configuration shown in FIG. 5 is a configuration after the capacity of the battery module 4 in the system is increased. In addition to the comprehensive controller 1, detector 5, and AC/DC converter 2 explained in the first embodiment, one battery module 4 is connected to each of three DC/DC converters 3 connected to the AC/DC converter 2. Each battery module 4 is battery module "A" explained in the first embodiment, and has a capacity of 10 kwh.

When the system configuration changes from the configuration shown in FIG. 4 to that shown in FIG. 5, a management unit 11 of the comprehensive controller 1 outputs a signal for requesting the installation form of each DC/DC converter 3 and the capacity value of each battery module 4 from a communication unit 12. This signal is transmitted to a management unit 45 of each battery module 4 via a communication unit 25, communication conversion unit 24, and communication unit 23 of the AC/DC converter 2, a communication unit 33 of the DC/DC converter 3, and a communication unit 44 of the battery module 4. The management unit 45 outputs the capacity value of a secondary battery string 41 in the module from the communication unit 44. This signal is transmitted to the management unit 11 of the comprehensive controller 1 via the communication unit 33 of the DC/DC converter 3, the communication unit 23, communication conversion unit 24, and communication unit 25 of the AC/DC converter 2, and the communication unit 12 of the comprehensive controller 1. Thus, the management unit 11 acquires the installation form of each DC/DC converter 3 and the capacity value of each battery module 4.

To perform charge/discharge control corresponding to the acquired installation forms of the DC/DC converters 3 and the acquired capacity values of the battery modules 4, the management unit 11 of the comprehensive controller 1 outputs an output power value command signal to a control unit 32 of each DC/DC converter 3 via the communication unit 33. Based on this signal, the control unit 32 controls a voltage step-up/step-down unit 31.

Third Embodiment

The third embodiment will now be explained.

FIG. 6 is a block diagram showing a configuration example of a motor driving power conversion system for use in a power stabilization system according to the third embodiment.

This motor driving power conversion system includes a three-phase AC motor 51, a motor driving power converter 52, and a resolver 53 for angle detection.

The motor driving power converter 52 includes a bidirectional inverter 52a, control unit 52b, and communication unit 52c. The bidirectional inverter 52a converts the AC power of each phase from the motor 51 into DC power and charges the DC power in a secondary battery string 54, and converts the DC power from the secondary battery string 54 into AC power. The control unit 52b controls the operation of the bidirectional inverter 52a based on a signal transmitted from the resolver 53 via the communication unit 52c. The communication unit 52c outputs the signal from the resolver 53 to the control unit 52b.

FIG. 7 is a block diagram showing a configuration example of a power stabilization system according to the third embodiment.

In this system, the motor driving power converter 52 shown in FIG. 6 is used in place of the AC/DC converter 2 explained in the first embodiment. In this embodiment, the battery modules are two types, i.e., battery modules "A" and "B", and a DC/DC converter 3 is connected to each battery module.

Also, in this embodiment, a distribution system is connected to the bidirectional inverter 52a of the motor driving power converter 52. The bidirectional inverter 52a is connected to a voltage step-up/step-down unit 31 of the DC/DC converter 3. A communication unit 12 of a comprehensive controller 1 is connected to the communication unit 52c of the motor driving power converter 52.

This system further includes a phase detecting conversion circuit 55. The phase detecting conversion circuit 55 detects the phase of electric power between the distribution system and bidirectional inverter 52a, and outputs the detected phase to the communication unit 52c of the motor driving power converter 52.

The bidirectional inverter 52a of the motor driving power converter 52 converts the AC power from the distribution system into DC power and outputs the DC power to the DC/DC converter 3, and converts the DC power from the DC/DC converter 3 into AC power and outputs the AC power to the distribution system.

The control unit 52b generates a power supply voltage sync signal based on a communication command from the comprehensive controller 1 or the detection result from the phase detecting conversion circuit 55, thereby controlling the operation of the bidirectional inverter 52a.

The communication unit 52c exchanges information with the comprehensive controller 1 and DC/DC converter 3. The communication unit 52c also outputs the detection result from the phase detecting conversion circuit 55 to the control unit 52b.

The configuration as described above can construct a system similar to that explained in the first embodiment even when using the motor driving power converter 52 in place of the AC/DC converter 2 explained in the first embodiment.

Fourth Embodiment

The fourth embodiment will be explained below.

FIG. 8 is a flowchart showing an example of a procedure performed by the power stabilization system according to the fourth embodiment.

This embodiment differs from the first embodiment in that three battery modules 4 are connected to one DC/DC converter 3. The DC/DC converter 3 may also be the motor driving power converter 52 explained in the third embodiment.

A voltage step-up/step-down unit 31 of the DC/DC converter 3 has three connection terminals connected in one-to-one correspondence with secondary battery strings 41 of the battery modules 4. A communication unit 33 of the DC/DC converter 3 also has three connection terminals connected in one-to-one correspondence with communication units 44 of the battery modules.

If the secondary battery strings 41 of the battery modules 4 have different characteristics, a comprehensive controller 1 outputs a command signal explained in the first embodiment, i.e., a command signal for selecting a battery module to be charged or discharged from the plurality of battery modules 4, in accordance with the current value of the distribution system, to the DC/DC converter 3 via an AC/DC converter 2. Based on this signal, the voltage step-up/step-down unit 31 of the DC/DC converter 3 outputs, to each battery module 4, a charge/discharge command signal corresponding to the battery module 4, thereby individually controlling charge/discharge of the battery module 4.

If the characteristics of the secondary battery strings 41 of the battery modules 4 are the same, the comprehensive controller 1 outputs, to the DC/DC converter 3 via the AC/DC converter 2, a command signal for selecting a battery module as a charge destination or discharge source, or adjusting the charge amount in a charge/discharge standby state, so that the charge amounts of the battery modules do not simultaneously become smaller than a reference value at which the operation is possible. Based on this signal, the voltage step-up/step-down unit 31 of the DC/DC converter 3 outputs, to each battery module 4, charge/discharge command signal corresponding to the battery module 4, thereby individually controlling charge/discharge of the battery module 4.

The configuration as described above can implement the same configuration as that of the first embodiment without using DC/DC converters equal in number to the battery modules unlike in the first embodiment.

Fifth Embodiment

The fifth embodiment will be explained below.

Figure 9:
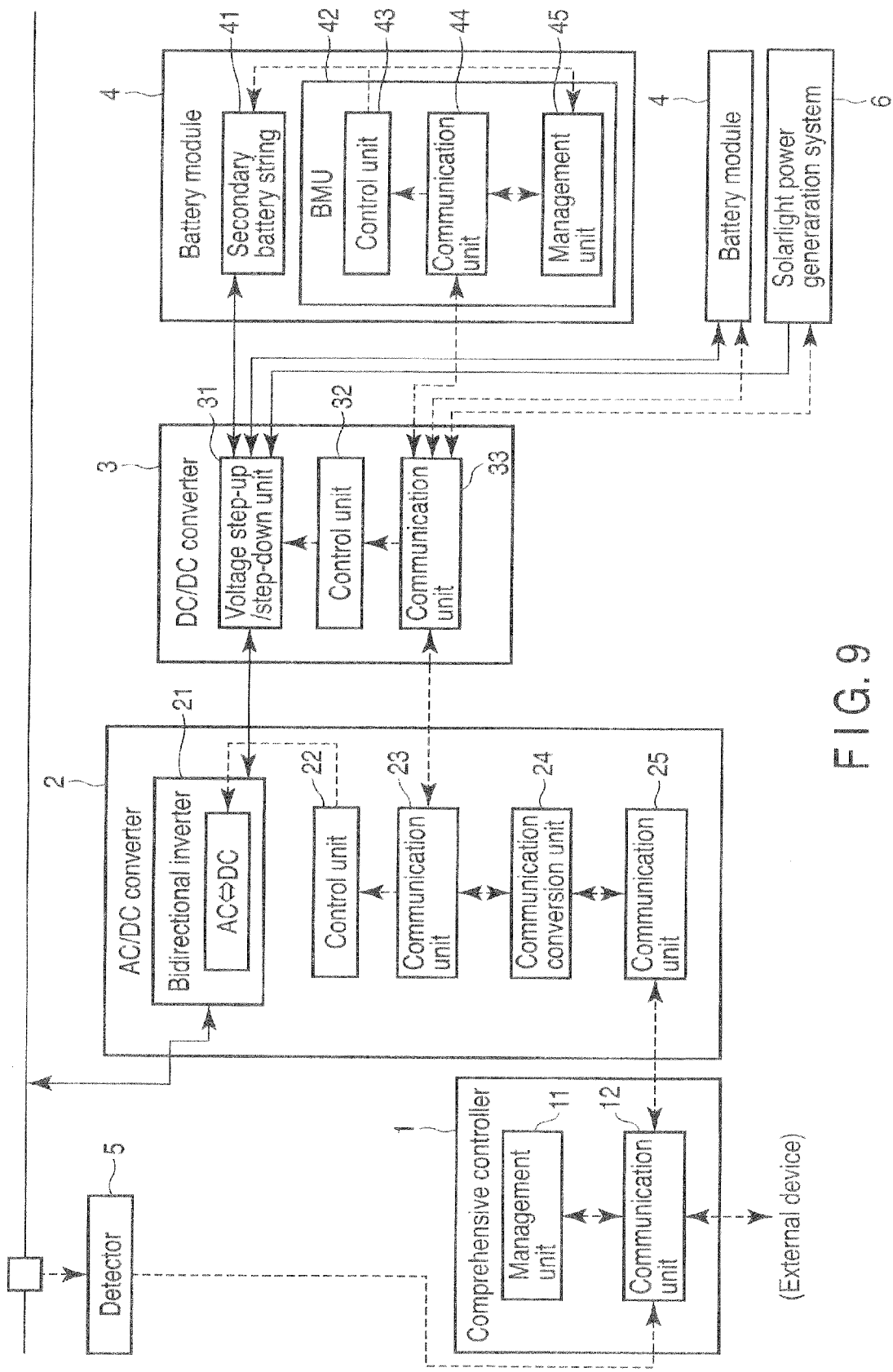
FIG. 9 is a block diagram showing a configuration example of a power stabilization system according to the fifth embodiment.

FIG. 9 is a block diagram showing a configuration example of a power stabilization system according to the fifth embodiment.

In this system, one of the battery modules 4 explained in the fourth embodiment is replaced with a solarlight power generation system 6.

The solarlight power generation system 6 outputs electric power generated by a solar battery (not shown) to a DC/DC converter 3.

In this embodiment, two of three connection terminals of a voltage step-up/step-down unit 31 of the DC/DC converter 3 are connected to secondary battery strings 41 of two battery modules. The third terminal is connected to the power output terminal of the solarlight power generation system 6. Two of three connection terminals of a communication unit 33 of the DC/DC converter 3 are connected in one-to-one correspondence with communication units 44 of the battery modules. The third terminal is connected to the signal input/output terminal of the solarlight power generation system 6.

When it is necessary to charge the battery modules 4 in this system, a comprehensive controller 1 outputs, to each battery module 4, a command signal for the module selecting process or an SOC request signal for the charge/discharge life control process explained in the first embodiment. Also, when it is necessary to discharge each battery module 4 or the solarlight power generation system 6, the comprehensive controller 1 outputs the command signal for the module selecting process explained in the first embodiment to each battery module 4 or the solarlight power generation system 6, or outputs the SOC request signal for the charge/discharge life control process explained in the first embodiment to each battery module 4.

Furthermore, to extract a maximum energy from the solarlight power generation system 6, the communication unit 33 may receive a signal pertaining to the power generation status of the solar battery from the solarlight power generation system 6 and transfer the information to a control unit 32, and the control unit 32 may instruct the voltage step-up/step-down unit 31 to perform maximum power point tracking (MPPT), thereby controlling the output voltage and output current of solarlight power generation.

Sixth Embodiment

The sixth embodiment will be explained below.

Figure 10:
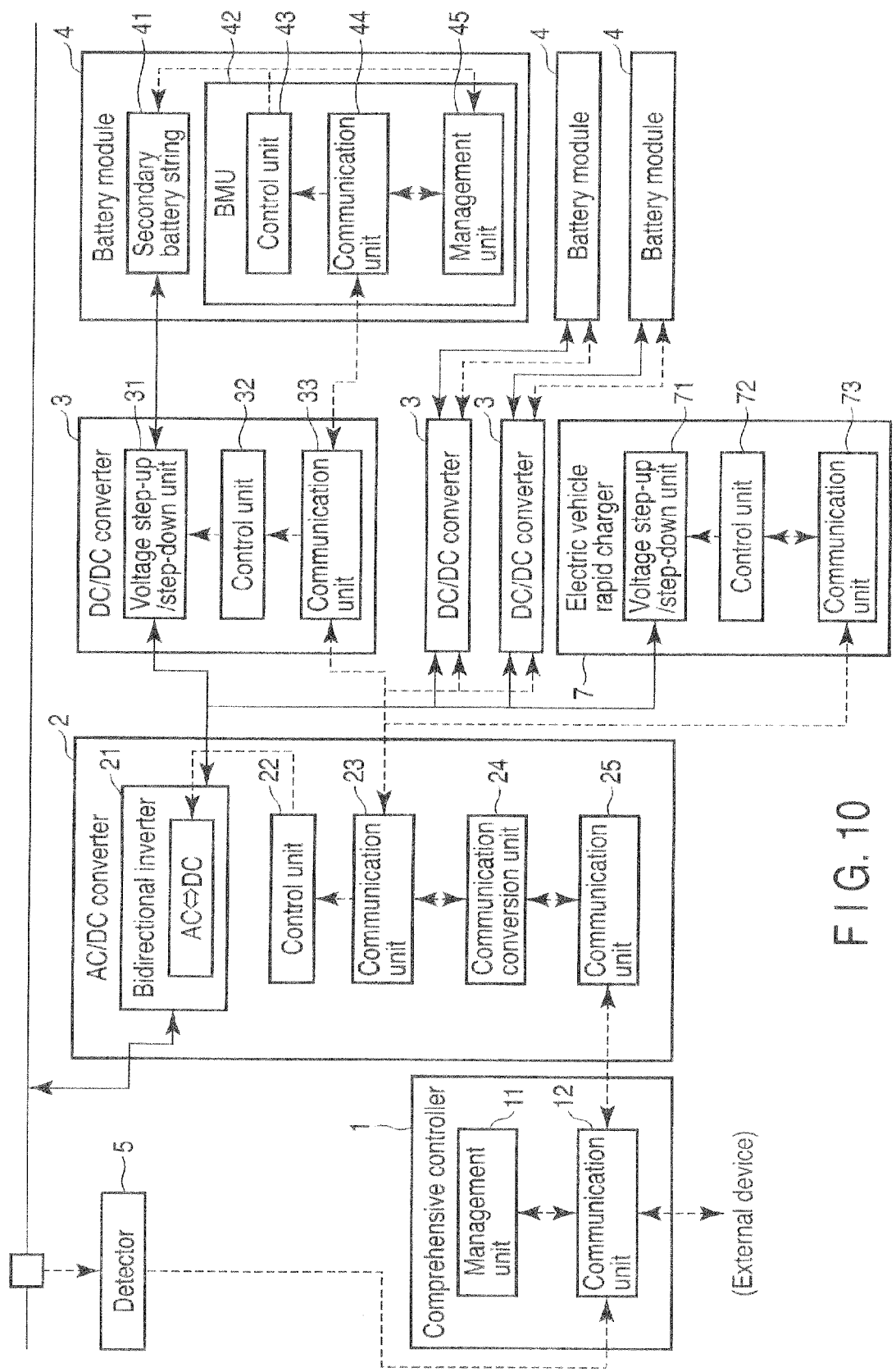
FIG. 10 is a block diagram showing a configuration example of a power stabilization system according to the sixth embodiment.

FIG. 10 is a block diagram showing a configuration example of a power stabilization system according to the sixth embodiment.

In this system, an electric vehicle rapid charger 7 is added to the configuration explained in the first embodiment. The electric vehicle rapid charger 7 includes a voltage step-up/step-down unit 71, control unit 72, and communication unit 73. The voltage step-up/step-down unit 71 is detachable from a bidirectional inverter 21 of an AC/DC converter 2.

The voltage step-up/step-down unit 71 performs voltage conversion on DC power from the AC/DC converter 2 and charges a secondary battery of an electric vehicle (not shown), and performs voltage conversion on electric power stored in this secondary battery and discharges the power to the AC/DC converter 2.

The control unit 72 controls the voltage step-up/step-down unit 71 based on a communication command from a comprehensive controller 1 or the AC/DC converter 2. The communication unit 73 exchanges information with the AC/DC converter 2.

In this system, the electric vehicle rapid charger 7 is connected to the AC/DC converter 2. With the electric vehicle rapid charger 7 being connected to a secondary battery of an electric vehicle, a set of the electric vehicle rapid charger 7 and the secondary battery of the electric vehicle can be regarded as a of a fourth DC/DC converter 3 and fourth battery module. When it is necessary to charge the battery modules 4 or the secondary battery of the electric vehicle, the comprehensive controller 1 outputs, to each battery module 4 or the electric vehicle rapid charger 7, a command signal for the module selecting process or an SOC request signal for the charge/discharge life control process explained in the first embodiment.

Also, when it is necessary to discharge each battery module 4 or the electric vehicle rapid charger 7, the comprehensive controller 1 outputs, to each battery module 4 the electric vehicle rapid charger 7, the command signal for the module selecting process or the SOC request signal for the charge/discharge life control process explained in the first embodiment.

The configuration as described above can perform charge/discharge control by regarding a set of the electric vehicle rapid charger and an electric vehicle as a set of the DC/DC converter and battery module. Accordingly, it is possible to effectively use the charge/discharge function of the electric vehicle rapid charger and electric vehicle.

Seventh Embodiment

The seventh embodiment will be explained below.

Figure 11:
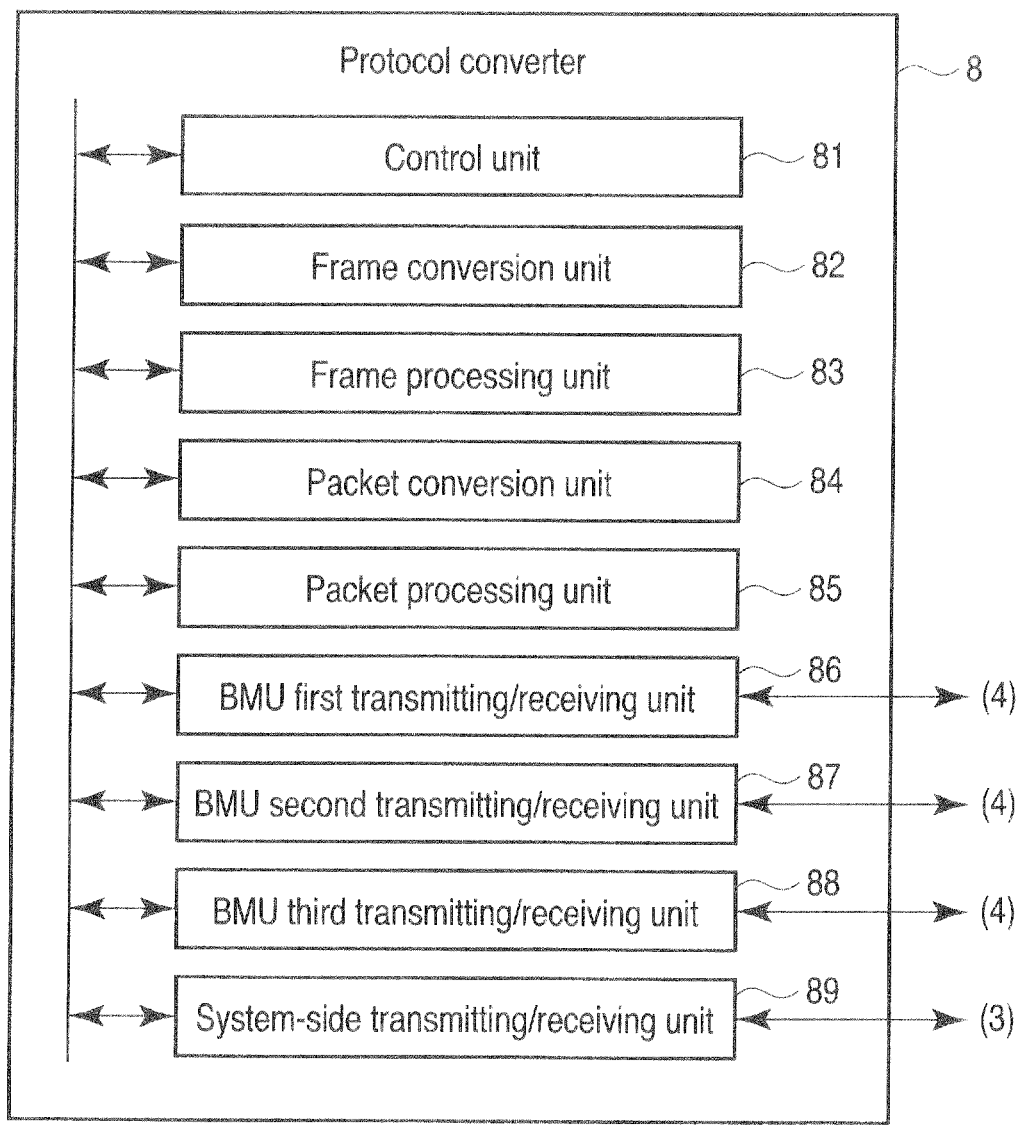
FIG. 11 is a block diagram showing a configuration example of a protocol converter of a power stabilization system according to the seventh embodiment.

FIG. 11 is a block diagram showing a configuration example of a protocol converter of a power stabilization system according to the seventh embodiment.

This embodiment includes a protocol converter 8 for converting communication protocols to be processed by the plurality of types of battery modules explained in the above-described embodiments into a common communication protocol, if these communication protocols are different between the modules.

The protocol converter 8 is installed between each DC/DC converter 3 and a BMU 42 of each battery module, and includes a control unit 81, frame conversion unit 82, frame processing unit 83, packet conversion unit 84, packet processing unit 85, BMU first transmitting/receiving unit 86, BMU second transmitting/receiving unit 87, BMU third transmitting/receiving unit 88, and system-side transmitting/receiving unit 89.

A communication unit 33 of each DC/DC converter 3 is connected to the system-side transmitting/receiving unit 89 of the protocol converter 8. The BMU first transmitting/receiving unit 86 is connected to a communication unit 44 of the first battery module. The BMU second transmitting/receiving unit 87 is connected to a communication unit 44 of the secondary battery module. The BMU third transmitting/receiving unit 88 is connected to a communication unit 44 of the third battery module.

In this configuration, when any of the BMU first transmitting/receiving unit 86, BMU second transmitting/receiving unit 87, and BMU third transmitting/receiving unit 88 of the protocol converter 8 receives a signal from the communication unit 44 of the EMU 42 of each battery module 4 in order to perform the above-described module selecting process or charge/discharge life control process, the frame conversion unit 82 and packet conversion unit 84 convert a frame and packet in order to convert a communication protocol of the input signal into a predetermined common protocol. Then, the frame processing unit 83 and packet processing unit 85 output a communication signal containing the converted frame and packet to the communication unit 33 of the DC/DC converter 3 corresponding to the battery module 4 as a signal transmission source, via the system-side transmitting/receiving unit 89.

In the configuration as described above, even when communication protocols to be processed by the battery modules are different between them because the characteristics of secondary battery strings 41 or the specifications of the BMUs 42 of the battery modules 4 are different, a normal communication process can be performed between the DC/DC converter 3 and battery module 4. Accordingly, it is possible to normally perform the module selecting process and charge/discharge life control process as explained in the first embodiment.

Each embodiment described above can provide a power stabilization system capable of properly stabilizing the electric power of a distribution system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power stabilization system comprising:
   a first power converter which is connected to a power system and performs bidirectional conversion between AC power and DC power;
   a plurality of battery modules, each battery module including a plurality of secondary batteries of a same type, and the types of the secondary batteries being different for each of the plurality of battery modules;
   a second power converter provided for each of the plurality of battery modules, wherein the second power converter (i) is connected between the first power converter and the battery module, (ii) converts DC power from the first power converter and charges a secondary battery of the battery module, and (iii) converts electric power charged in the battery module and discharges the converted electric power to the first power converter; and
   a controller which controls charge or discharge of each of the plurality of battery modules in accordance with a current value of the power system;
   wherein priorities for charging or discharging battery modules to be charged or discharged are determined by making a first comparison between a charge current or a discharge current of each of the battery modules to be charged or discharged and a reference value, and then making a second comparison between remaining lifetimes of the battery modules to be charged or discharged.

2. A power stabilization method for use in a power stabilization system, the power stabilization system comprising a first power converter which is connected to a power system and performs bidirectional conversion between AC power and DC power, a plurality of battery modules each including a plurality of secondary batteries of a same type, and a second power converter provided for each of the plurality of battery modules, wherein the types of the secondary batteries are different for each of the plurality of battery modules, wherein the second power converter (i) is connected between the first power converter and the battery module, (ii) converts DC power from the first power converter and charges a secondary battery of the battery module, and (iii) converts electric power charged in the battery module and discharges the converted electric power to the first power converter, and wherein the method comprises:

controlling charge or discharge of each of the plurality of battery modules in accordance with a current value of the power system;

wherein priorities for charging or discharging battery modules to be charged or discharged are determined by making a first comparison between a charge current or a discharge current of each of the battery modules to be charged or discharged and a reference value, and then making a second comparison between remaining lifetimes of the battery modules to be charged or discharged.

3. The system according to claim 1, wherein the controller sets a number of the battery modules to be charged or discharged from among the plurality of battery modules, in accordance with a magnitude of a change in the current value of the power system.

4. The system according to claim 3, wherein the controller selects a battery module to be charged or discharged from among the plurality of battery modules, in accordance with characteristics of the secondary batteries of the plurality of battery modules.

5. The system according to claim 1, wherein:
the secondary batteries of the plurality of battery modules have different characteristics; and
the controller (i) performs control in a charge/discharge standby state in which it is unnecessary to charge or discharge the plurality of battery modules, such that a charge amount of each secondary battery satisfies an optimum condition in the charge/discharge standby state, (ii) controls a charge amount of a battery module including a secondary battery whose charge amount is less than a predetermined reference value, when it is necessary to charge any of the plurality of battery modules, and (iii) controls a discharge amount of a battery module including a secondary battery whose charge amount has exceeded the predetermined reference value, when it is necessary to discharge any of the plurality of battery modules.

6. The system according to claim 1, further comprising:
a detector which detects the current value of the power system;
wherein the first power converter is a three-phase AC motor power converter including:
an AC terminal to be connected to a three-phase AC motor;
an input terminal which receives a rotational angle signal from the three-phase AC motor; and
a control unit which controls rotation of the three-phase AC motor in accordance with the rotational angle signal;
wherein the AC terminal is connected to the power system;
wherein the input terminal receives a detection result from the detector; and
wherein bidirectional conversion between AC power and DC power is performed in accordance with the detection result received by the input terminal.

7. The system according to claim 1, wherein a solarlight power generation system is connected to a battery module side terminal of the second power converter, and the controller controls an amount, which is to be discharged to the power system, of electric power generated by the solarlight power generation system, in accordance with the current value of the power system.

8. The system according to claim 1, further comprising an electric vehicle charger to be connected to a DC terminal of the first power converter and an electric vehicle, wherein the controller controls a charge amount or discharge amount of each of the plurality of battery modules and the electric vehicle charger in accordance with the current value of the power system.

9. The system according to claim 1, wherein each of the plurality of battery modules outputs information containing a secondary battery charge amount in accordance with a communication protocol which changes from one battery module to another, the system further comprises a converter which converts the communication protocol of the information from each of the plurality of battery modules into a predetermined common communication protocol, and the controller controls a charge amount or discharge amount of each of the plurality of battery modules in accordance with the current value of the power system, and the information transmitted from the battery module in accordance with the communication protocol converted by the converter.

* * * * *